United States Patent
Miyauchi et al.

(10) Patent No.: US 6,298,029 B1
(45) Date of Patent: Oct. 2, 2001

(54) INFORMATION RECORDING AND REPRODUCING APPARATUS AND METHODS OF RECORDING AND REPRODUCING INFORMATION USING SOLID IMMERSION LENS HAVING SUPER RESOLUTION FILM DEPOSITED THEREON

(75) Inventors: Yasushi Miyauchi, Akishima; Kimio Nakamura, Tokorozawa, both of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/197,445

(22) Filed: Nov. 23, 1998

(30) Foreign Application Priority Data

Nov. 25, 1997 (JP) .................................................. 9-322653

(51) Int. Cl.⁷ ........................................................ G11B 7/00
(52) U.S. Cl. ................................................... 369/112.23
(58) Field of Search .............................. 369/112, 112.01, 369/112.23

(56) References Cited

U.S. PATENT DOCUMENTS

| | | | |
|---|---|---|---|
| 5,497,359 | * 3/1996 | Mamin et al. | ................... 369/112 X |
| 5,529,864 | 6/1996 | Tachibana et al. . | |
| 5,729,393 | * 3/1998 | Lee et al. . | |
| 5,881,042 | * 3/1999 | Knight | ............................. 369/112 X |
| 5,883,872 | * 3/1999 | Kino | ............................. 369/112 OR |
| 5,889,751 | * 3/1999 | Tsujioka et al. | ..................... 369/116 |
| 5,985,401 | * 11/1999 | Yamaamoto et al. | ............ 369/283 X |

FOREIGN PATENT DOCUMENTS

| | | |
|---|---|---|
| 0 713 216 A1 | 5/1996 | (EP) . |
| 6-215408 | 8/1994 | (JP) . |
| WO 97/41556 | 11/1997 | (WO) . |
| WO 98/54707 | 12/1998 | (WO) . |

\* cited by examiner

Primary Examiner—Aristotelis M. Psitos
(74) Attorney, Agent, or Firm—Antonelli, Terry, Stout & Kraus, LLP

(57) ABSTRACT

An information recording and reproducing apparatus includes an optical head having a super resolution film formed therein. The optical head includes a laser for producing an energy beam, a lens for focusing the energy beam and a super resolution film disposed in a position on which the energy beams is focused by the lens, whereby recording and reproducing of high-density information is attained.

6 Claims, 1 Drawing Sheet

INFORMATION RECORDING AND REPRODUCING APPARATUS AND METHODS OF RECORDING AND REPRODUCING INFORMATION USING SOLID IMMERSION LENS HAVING SUPER RESOLUTION FILM DEPOSITED THEREON

BACKGROUND OF THE INVENTION

The present invention relates to an information recording and reproducing method and apparatus capable of recording or reproducing FM-modulated analog codes, such as image and voice signals and digital information, for example, data used in computers, facsimile signals and digital audio signals, using a recording beam, such as laser light, in real time.

Recently, a high-density optical recording technique with increased capacity has been developed. However optical recordings have the limitation that a diameter of a recording bit is about 500 nm due to the diffraction of light. The diffractive limitation is directly proportional to the wavelength of light and inversely proportional to a numerical aperture (NA) of a lens. Accordingly, an orientation for high-density recording is to shorten the wavelength of light and increase the numerical aperture of an objective lens. Alternatively, it is possible to utilize the optical phenomenon independent of the diffractive limitation. One method for manufacturing a recording medium involves forming a super-resolution film on a recording film. Further, in an optical head, an attention is paid to a near-field in light recently as a method of pushing forward the above methods. For example, as described in U.S. Pat. No. 5,121,256, a solid immersion lens (SIL) is used to attain a large numerical aperture, so that a smaller spot diameter is obtained as compared with that of a conventional optical lens. The principle thereof is now described. The solid immersion lens is provided by polishing a spherical lens made of transparent material and having a large refractive index n into a hemisphere, for example. Laser light concentrated by an objective lens then becomes focused on the polished surface or flat surface. The velocity of laser light in the solid immersion lens slows by the refractive index and the wavelength thereof is shortened to 1/n. That is, the diffractive limitation in the solid immersion lens reduces to 1/n as compared with a usual value. From a different viewpoint, it may be stated that the numerical aperture (NA) of the objective lens can increase by n times. In this time, the numerical aperture increases within the solid immersion lens, although when the laser light passes through the solid immersion lens into air, the diameter of the beam spot thereof returns to the former diameter again. However, when the distance between the flat surface corresponding to a bottom surface of the solid immersion lens and a sample (such as a recording film of a disk) is shortened to 200 nm or less (near-field), the laser light is transmitted to the sample, while the wavelength thereof stays at 1/n as compared with the wavelength $\lambda$ of incident light and accordingly the resolution increases with n times. That is, the diffractive limitation reduced to 1/n, as compared with the usual value, can be obtained.

SUMMARY OF THE INVENTION

It is an object of the present invention to provide an information recording and reproducing method and apparatus capable of realizing higher-density recording or reproducing.

According to the present invention, a super resolution film is formed in an optical head to thereby attain higher-density recording. Further, the super resolution film is formed in a solid immersion lens (SIL) to thereby attain higher-density recording. The super resolution film is a film that functions to make the diameter of a beam spot emitted from the super resolution film smaller than the diameter of an incident beam when the incident beam entering the super resolution film emits therefrom. The degree that the diameter of the beam spot is made small is different depending on kinds of the super resolution film used. In addition, the super resolution film is often formed in a flat portion (for example, a polished bottom surface) of the solid immersion lens. In present invention, photochromic material is mainly used as the super resolution film and the multiphoton absorption, photobleaching, saturated absorption and the like are utilized. For multiphoton absorption, material may be used having no light absorption for a wavelength of a one-photon and having light absorption in an energy region of a two-photon (a half of a wave-length of the one-photon). Since the reaction of the two-photon absorption is effected with a square of the light intensity, an optically changed area is a squared shape of a spot size of the irradiation light. From a different viewpoint, the wavelength may be replaced with the light intensity and the absorption may be replaced with the transmission. For example, the transmissivity of the multiphoton absorption film does not change in a weak light intensity, while the two-photon absorption occurs in a sufficiently strong light intensity and the transmissivity increases in that area. The multiphoton absorption film involves a film containing DANS (4-dimethylamino-4'-nitrostilbene) or N-methylaniline or P-nitroaniline or the like or acrylic resin or the like. Furthermore, the photobleaching film produces the optical reaction to effect photobleaching progressively so that light transmits the film at the irradiation portion of light having a strong intensity and does not effect photobleaching progressively so that light does not transmit the film at the irradiation portion of light having the weak intensity. Water-soluble diazonium salts or fluorine diarylethene (FC-124) or the like may be used for the photobleaching film. In addition, the photo-bleaching film may use material having the characteristic hat when laser light is irradiated thereto a degree of exceeding a certain threshold, the coloring matter or pigment in the base level disappears, so that the material does not absorb light any longer as a saturable absorption film. The material involves phthalocyanine or naphthalocyanine pigment or the like. As described above, since the transmissivity in the middle portion of the irradiation beam increases, the beam transmits only this area. Consequently, the diameter of the beam spot is made small apparently (super resolution phenomenon).

Further, even when a pin hole film having a hole formed therein and smaller than a diameter of an incident beam is disposed on a bottom surface of the solid immersion lens instead of the super resolution film, similar effects can be attained. As document JP-A-5-234117 discloses the similar technique with respect to utilization of the pin hole, while in the present invention the film having the pin hole formed therein must be used in order to dispose the pin hole film on the bottom surface of the solid immersion lens.

The super resolution film has been disposed on the side of the sample (recording medium) and used for the super resolution reproduction mainly. In the present invention, the super resolution film is disposed on the side of the lens to thereby be able to apply the present invention to the super resolution recording without limitation to the super resolution reproduction. It is a matter of course that the super resolution film is formed on the solid immersion lens to thereby attain higher density recording and furthermore the super resolution film is also disposed on the side of the sample (recording medium) to thereby attain still higher density recording.

When the super resolution film is used in the present invention, a film (reversible film) having the transmissivity in the middle portion, to which an energy beam is irradiated, of the super resolution film, the transmissivity is increased when the energy beam is irradiated thereto and is reduced when the irradiation is stopped; it is preferable that the transmissivity in the middle portion of the super resolution film to which the energy beam is irradiated is always increased even if any positional shift of the beam occurs. However, the film (non-reversible film) having the transmissivity in the middle portion increased even when the irradiation of the beam is stopped may be used if necessary. In the case of the pin hole film, when the beam is deviated from the pin hole, recording and reproduction cannot be performed, even though the pin hole film can be manufactured inexpensively and easily. The reversible film is advantageous in that recording or reproduction can be always performed.

In the case where an energy beam and the refracting index beam (wavelength $\lambda$) is not irradiated to the film is n, it is preferable that a thickness of the super resolution film is about $\lambda/2n$.

Further, lubricant may be provided between the solid immersion lens and the sample if necessary. The lubricant is preferably made of the same material as that of the solid immersion lens.

The recording and reproducing apparatus used in the present invention comprises a unit including a laser provided therein and for focusing a beam emitted from the laser on the super resolution film formed on the solid immersion lens by means of an objective lens, a unit for controlling a space between the super resolution film surface of the solid immersion lens and the sample, and a unit for rotating the recording medium. Further, the apparatus may comprise a unit including two lasers having different wavelengths and for performing recording by irradiation of light emitted from one laser and reproduction by irradiation of light emitted from the other laser if necessary.

In addition, the present invention can be applied to not only a disk-shaped recording medium but also other recording media having other shapes such as a card.

Furthermore, the present invention can be applied to not only recording and reproduction in a completed disk but also cutting of the original disk in manufacture of the disk.

DESCRIPTION OF THE PREFERRED EMBODIMENTS

The present invention is now described in detail with reference to an embodiment.

Figure 1:
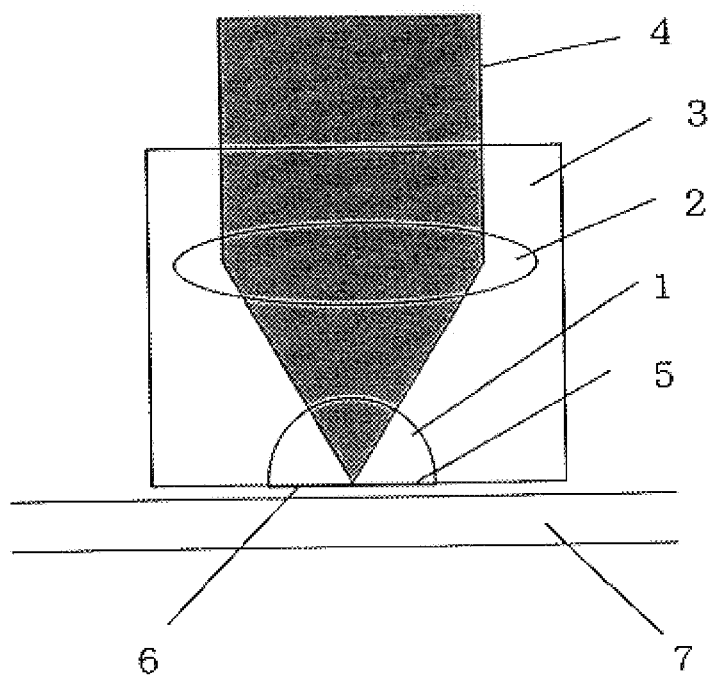
FIG. 1 is a schematic diagram illustrating a recording and reproducing system according to an embodiment of the present invention.

FIG. 1 schematically illustrates a recording and reproducing system in the embodiment. A laser beam 4 emitted by a semiconductor laser (wavelength 410 nm) is incident on a flying head 3 including a solid immersion lens (SIL) 1 and an objective lens 2 formed integrally. The laser beam 4 is focused on a flat surface 5 of the solid immersion lens 1.

Figure 2:
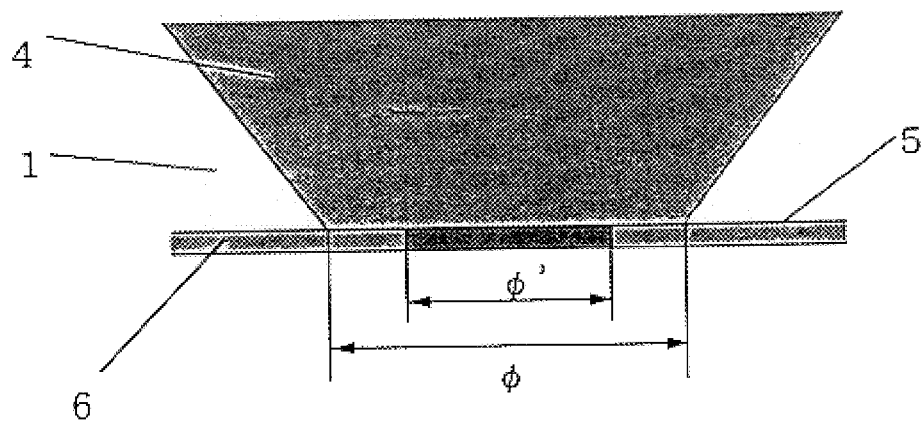
FIG. 2 is an enlarged view of a plane portion of a solid immersion lens (SIL).

Further, a super resolution film 6 is formed on the flat surface (flat portion) 5 of the solid immersion lens. The super resolution film 6 is one made of photochromic material or multiphoton absorption film or photobleaching film. In addition, a distance between the flying head (optical head) 3 and a disk 7 is as close as about 100 nm (near-field area). The distance is controlled in accordance with a shape of the flying head 3 and a rotational number of the disk 7 and is maintained of a substantially constant distance. FIG. 2 shows the flat portion of the flying head 3 in enlarged scale. A diameter ($\Phi$) of a beam spot on the flat surface 5 of the solid immersion lens is expressed by the following equation, where the refractive index of the solid immersion lens is n, the wavelength of the laser is $\lambda$ and the numerical aperture of the objective lens is NA.

$$\Phi \approx (1/n) \times (\lambda/NA)$$

That is, the diffractive limitation reduced to 1/n as compared with the usual value can be obtained. Further, the solid immersion lens 1 is formed into a super hemisphere by cutting only a part of a sphere with a plane while leaving the most part of the sphere, so that the diameter of the beam can be further reduced to $\Phi \approx \lambda/n^2$. In the embodiment, a multiphoton absorption film is used as the super-resolution film 6. In particular, acrylic resin is used to form the multiphoton absorption film to 100 nm. The acrylic resin has no light absorption at a wavelength in the vicinity of 410 nm which is a wavelength of a one-photon, and has light absorption at a wavelength in the vicinity of 205 nm corresponding to an energy region (wavelength equal to one half the wavelength of one photon) of a two-photon. Since the reaction of the two-photon absorption is effected with a square of the light intensity, an optically changed area is a squared shape of a spot size of the irradiation light. Further, since the reaction of a three-photon absorption is effected with the cube of the light intensity, an optically changed area is a cubed shape of the spot size of the irradiation light. It is assumed that the diameter of the spot in the case of only the solid immersion lens is 100%, the diameter of the spot at $1/e^2$ in the embodiment becomes about 74% for the two-photon absorption and about 61% for the three-photon absorption when the spot emerges from the multiphoton absorption film.

In the embodiment, the acrylic resin is used for forming the multiphoton absorption film, while even when a film containing DANS (4-dimethylamino-4'-nitrostilbene) or N-methylaniline or P-nitroaniline or the like is used therefor, similar effects can be attained.

Furthermore, even when photochromic material such as a photobleaching film (water soluble diazonium salts or fluorine diarylethene (FC-124) or the like) utilizing photobleaching or saturated absorption material (naphthalocyanine pigment or the like) is used as the super-resolution film 6 instead of the multiphoton absorption film, similar effects can be attained. In this case, the photobleaching film such as the water soluble diazonium salts sometimes has the transmissivity at its middle portion left to be high even when irradiation of the beam is stopped, although there is no problem since the diameter of the beam spot irradiated on the disk 7 is left to be small. Further, even when a pin hole film having a hole smaller than the beam spot incident on the super resolution film which is previously formed in the vicinity of the center of the incident beam is used, similar effects can be attained.

As described above, by forming the super resolution film 6, in the flat surface 5 of the solid immersion lens 1, the diameter of the beam spot can be made smaller than one in the prior art, so that the high-density recording and reproducing can be attained.

Further, the recording and reproducing apparatus and a disk 7 (for example, a magneto-optical disk to which the magnetic super resolution technique (MSR) can be applied) provided with a super resolution film can be used in combination to attain the higher-density recording and reproducing.

In the embodiment, recording and reproducing is made by means of a single laser, while even when recording and reproducing is made by using two lasers having different wavelengths, similar effects can be attained.

The distance between the super resolution film 6 formed in the flat surface 5 of the solid immersion lens 1 and a recording film surface of the disk 7 is as close as about 100 nm in order to use the near-field. The space portion may be filled with a transparent lubricant. Specifically, it is preferable that the lubricant is made of the same material as the solid immersion lens.

The recording and reproducing apparatus used in the present invention comprises at least means for mounting a laser to focusing a beam emitted by the laser on the super resolution film formed in the solid immersion lens by means of an objective lens, means for controlling the distance between the super resolution film surface of the solid immersion lens and the sample, and means for rotating a recording medium.

What is claimed is:

1. An apparatus for recording and reproducing information onto and from a recording medium by irradiation of an energy beam, comprising:

an energy source for irradiating an energy beam; and an optical head comprising a solid immersion lens and a super resolution film disposed on a surface of said solid immersion lens whose transmissivity is changed in a portion where an energy beam is irradiated, wherein said super resolution film is a photo-bleaching film of either water soluble diazonium salt or fluorine diarylethene (FC-124).

2. An apparatus for recording and reproducing information onto and from a recording medium by irradiation of an energy beam, comprising:

an energy source for irradiating an energy beam; and an optical head comprising a solid immersion lens and a super resolution film disposed on a surface of said solid immersion lens whose transmissivity is changed in a portion where an energy beam is irradiated, and means for controlling a distance between said super resolution film of said optical head and a surface of said recording medium at a predetermined level, wherein said distance between said super resolution film of said optical head and the surface of said recording medium is filled with transparent lubricant made of the same material as said solid immersion lens.

3. An apparatus for recording and reproducing information by irradiation of an energy beam, comprising:

an energy source for irradiating an energy beam; and an optical head comprising an objective lens which focuses said energy beam irradiated, a solid immersion lens (SIL) which further focuses said energy beam irradiated, via said objective lens, onto a recording medium for recording and reproducing information, said solid immersion lens (SIL) having a super resolution film deposited on a bottom surface thereof whose transmissivity is changed in a portion where an energy beam is irradiated, wherein said super resolution film is a photo-bleaching film of either water soluble diazonium salt or fluorine diarylethene (FC-124).

4. An apparatus for recording and reproducing information by irradiation of an energy beam, comprising:

an energy source for irradiating an energy beam; and an optical head comprising an objective lens which focuses said energy beam irradiated, a solid immersion lens (SIL) which further focuses said energy beam irradiated, via said objective lens, onto a recording medium for recording and reproducing information, said solid immersion lens (SIL) having a super resolution film deposited on a bottom surface thereof whose transmissivity is changed in a portion where an energy beam is irradiated; and means for controlling a distance between said super resolution film of said optical head and a surface of said recording medium at a predetermined level, wherein said distance between said super resolution film of said optical head and the surface of said recording medium is filled with transparent lubricant made of the same material as said solid immersion lens.

5. A method of recording and reproducing information onto and from a recording medium by irradiation of an energy beam, using an optical head having first and second lenses, said method comprising the steps of:

focusing an energy beam irradiated onto said recording medium with a first lens of said optical head, and further focusing said energy beam focused onto said recording medium with a second lens of said optical head, wherein said second lens has a super resolution film formed on a surface thereof, and whose transmissivity is changed in a portion where said energy beam is irradiated, and wherein said super resolution film is a photo-bleaching film of either water soluble diazonium salt or fluorine diarylethene (FC-124).

6. A method of recording and reproducing information onto and from a recording medium by irradiation of an energy beam, using a solid immersion lens (SIL), comprising the steps of:

focusing an energy beam irradiated onto said recording medium with a lens, and further focusing said energy beam focused onto said recording medium with said solid immersion lens (SIL) having a super resolution film formed on a surface thereof, and whose transmissivity is changed in a portion where said energy beam is irradiated, wherein said super resolution film is a photo-bleaching film of either water soluble diazonium salt or fluorine diarylethene (FC-124).

* * * * *